United States Patent
Thompson, Jr. et al.

Patent Number: 6,129,457
Date of Patent: *Oct. 10, 2000

[54] RESOLUTION ENHANCEMENT FOR A DIGITAL PRINTING APPARATUS

[75] Inventors: Robert R. Thompson, Jr., Harbor City; Farhad D. Rostamian, Los Angeles, both of Calif.; Louis D. Mailloux, Webster, N.Y.; Cheryl A. Pence, Buena Park, Calif.; Rosario A. Bracco, Webster, N.Y.; Cathleen J. Raker; Sue K. Lam, both of Rochester, N.Y.; George L. Harer, Walworth, N.Y.; Hung M. Pham, San Gabriel, Calif.; Daniel D. Truong, Lawndale, Calif.

[73] Assignee: Xerox Corporation, Stamford, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/886,507

[22] Filed: Jul. 1, 1997

[51] Int. Cl.⁷ ............................................. B41B 7/08
[52] U.S. Cl. ................................. 395/102; 382/266
[58] Field of Search .................... 382/194, 209, 382/269, 299, 267, 266, 217; 395/102, 109; 345/136

[56] References Cited

U.S. PATENT DOCUMENTS

| | | | |
|---|---|---|---|
| 4,437,122 | 3/1984 | Walsh et al. | 358/166 |
| 4,847,641 | 7/1989 | Tung | 346/154 |
| 5,025,322 | 6/1991 | Ng | 358/298 |
| 5,045,869 | 9/1991 | Isaka et al. | 346/108 |
| 5,157,417 | 10/1992 | Anzai | 346/108 |
| 5,329,599 | 7/1994 | Curry et al. | 382/266 |
| 5,357,273 | 10/1994 | Curry | 346/108 |
| 5,480,240 | 1/1996 | Bolash et al. | 400/124.01 |
| 5,483,605 | 1/1996 | Rostamian | 382/181 |
| 5,621,453 | 4/1997 | Fujita et al. | 347/240 |

*Primary Examiner*—Edward L. Coles
*Assistant Examiner*—Sterling Chandler
*Attorney, Agent, or Firm*—Robert Hutter

[57] ABSTRACT

A system for providing an output from a digital printing apparatus which is of higher resolution than the native resolution of the original image data. For a given center pixel area, image data corresponding to pixel areas generally neighboring the center pixel area are attempted to be matched to various templates which are consistent with curved lines in which resolution enhancement of the center pixel would be desirable. In a second stage of template matching, a second set of image data, corresponding to pixel areas further away from the center pixel than the first set of pixel areas, is also attempted to be matched to templates. The second stage of template matching helps to avoid resolution enhancement of image data which is related to a halftone image.

14 Claims, 5 Drawing Sheets

Perimeter: $a_1a_2a_3a_4a_5a_6a_7b_7c_7d_7e_7f_7g_7g_6g_5g_4g_3g_2g_1f_1e_1d_1c_1b_1$

*FIG. 2*

|   |   |   |   |   |   |   |
|---|---|---|---|---|---|---|
| 1 | 1 | 1 | 1 | 1 | 1 | 1 |
| 1 | 0 | 1 | 1 | 1 | 0 | 1 |
| 1 | 0 | 0 | 0 | 0 | 0 | 1 |
| 1 | 1 | 1 | 0 | 0 | 1 | 1 |
| 1 | 0 | 1 | 0 | 1 | 0 | 1 |
| 0 | 0 | 0 | 0 | 1 | 1 | 1 |
| 1 | 0 | 1 | 1 | 0 | 0 | 0 |

*FIG. 3*

```
      5x5: 1100001010100110000001110
Perimeter: 0001101011111111111111
```

*FIG. 4*

```
                                SUBPIXEL
        IMAGE INPUT              OUTPUT    PERIMETER
                                           ENABLE
XXXXX10101000001111100000-1100,1
11111X1XX000100X1X1X10000-0011,1
1XXXX11000110001100011111-1100,0
11XXX11000110001100011111-1100,0
111XX11000110001100011111-0101,1
0011100111XX111XXX1100000-1010,0
110001100011000XXX11XXX11-1010,1
000001111101010X1X1X0X0X0-1010,0
X1111X1111X1110000000000-1000,1
0XXXX0XXXX00XXX1111111111-0111,1
```

FIG. 5

```
                                  PERIMETER
        IMAGE INPUT                MATCH
111110101000001111100000-1
111111000100010101010000-1
000011000110001100011111-1
111111000110001100011111-1
111111111110001100011111-1
011100111001110001100000-1
100011000110001111111111-1
000011111010100101000000-1
111101111011110000000000-1
111101111001111111111111-1
```

RESOLUTION ENHANCEMENT FOR A DIGITAL PRINTING APPARATUS

FIELD OF THE INVENTION

The present invention relates to a system for converting the native resolution of image data supplied to a digital printing apparatus, to obtain an output of a higher resolution.

BACKGROUND OF THE INVENTION

In digital printing, such as with well-known technologies such as "laser printing" or ink-jet printing, digital image data representative of a particular image desired to be printed is supplied to hardware, such as a modulating laser or an ink-jet printhead. In general, from the perspective of providing an attractive appearance for the printed output, a higher resolution is always better. If a resolution of the printer is too low, certain well-known artifacts will result in the printed sheet, particularly jagged edges around curved lines or curved borders of alphanumeric characters. At the same time, there are advantages to providing image data to printing hardware which is of a relatively low resolution: foremost among these advantages is the fact that, at a lower resolution, significantly less data is required to express an image desired to be printed. There is therefore an advantage to a capability of deriving from relatively low resolution image data, such as at 300 dpi, image data which can operate hardware at a high resolution, such as at 600 dpi or higher.

In the prior art, there have been proposed many techniques for performing this "resolution enhancement." Some of these techniques will be described in detail below, but many of them basically involve taking the original low-resolution data and interpolating image data which appears to represent curved lines and orders, and in effect "filling in" extra pixels to smooth out where jagged edges would appear.

Various interpolation or smoothing techniques have different advanatages and disadvantages. For example, some techniques may require that the image data be temporarily retained in a memory so that an interpolation function can be carried out on the data; such temporary caching of image data will of course represent a consumption of time and memory, with the long-term effect of causing printing efficiency to suffer. Other techniques are capable of operating on image data in close to "real-time," in effect altering the original low-resolution data while the data is on its way to the hardware. This "real-time" resolution enhancement typically operates by consistently applying an algorithm to the stream of image data. One drawback to many "real-time" systems is that the consistent application of a particular algorithm may have unpredictable effects depending on the nature of the original image data: an algorithm which is successful in smoothing out the borders of alphanumeric characters may have a deleterious effect when applied to, for example, data attempting to express a halftone image.

The present invention describes a real-time resolution enhancement technique which preserves the advantages of a real-time technique, while ensuring the integrity of certain data which describes certain types of images, such as halftones.

DESCRIPTION OF THE PRIOR ART

U.S. Pat. No. 4,437,122 describes the basic principle of resolution enhancement using a sample of pixels neighboring a center pixel and printing in sub-pixel areas of the center pixel.

U.S. Pat. No. 4,847,641 discloses a system for enhancing print images in a dot matrix printer. For each central cell (bit) in a desired image to be printed, a sample window of neighboring bits is compared to a series of matching bit patterns or templates, to determine whether the neighboring bits form, for example, a curved area in the image. If the neighboring bits conform to a particular template, if necessary the central bit is modified to carry out a resolution enhancement process.

U.S. Pat. No. 5,025,322 discloses a technique for effectively increasing the resolution of images produced by an electrophotographic printer with an LED printhead. In a specific example of a 400 dpi printhead, gray level data is sent to the printhead at a rate to record 2400 lines per inch, to provide a resolution of 400 dpi×2400 dpi subpixels. The control for controlling the duration of recording of each LED for each sub-line includes a comparator which receives a gray level data signal.

U.S. Pat. No. 5,045,869 discloses a system for digitally printing images in which the original data comprises data of two resolutions, one for text data and one for image data, which may be different from each other.

U.S. Pat. No. 5,157,417 discloses a digital printer, such as using a modulating laser, which is capable of printing in different resolutions even in different portions of the same image.

U.S. Pat. No. 5,357,273 discloses a method for resolution conversion in a laser printer by microaddressing image transitions within the image, such as from a print-white to print-black portion. Algorithms are used to determine fine relationships among different pixel areas in the image, and the modulation of the laser is adapted accordingly to perform the microaddressing.

U.S. Pat. No. 5,480,240 describes a resolution enhancement arrangement for a dot matrix printer or thermal ink-jet printer. In particular, the method of this invention takes into account the frequency response of the print elements in the printhead to compensate for pixels in the enhanced image data which are physically unprintable.

U.S. Pat. No. 5,483,605 describes a "real-time" resolution enhancement system which, for each pixel area in an image desired to be printed, compares a window of image pixels around the particular image pixel to a set of templates. The comparison logic, instead of comparing the entire set of bits in the window to the templates, uses a small number of logic blocks in parallel, so that a number of image pixels can be processed simultaneously with a high-speed, relatively low-complexity circuit.

U.S. Pat. No. 5,621,453 discloses an LED printer in which the operation of the individual LED elements is manipulated to effectively obtain a resolution twice as fine as the physical construction of the LED printhead would normally allow. For one scanning line, a plurality of divided exposure lines are produced such as to permit the LED array to be turned on at double duty in the scanning direction, thus permitting the array to be turned on twice as often for each scanning line.

SUMMARY OF THE INVENTION

According to one aspect of the present invention, there is provided, in a digital printing apparatus for selectably writing in a subset of a set of pixel areas on a surface to obtain an image according to image data, the printing apparatus further being capable of selectably writing within a subset of a set of subpixel areas within each pixel area, a method of enhancing the image. For each of a plurality of center pixel areas in the image desired to be printed, image data corresponding to a first set of pixel areas in a first predetermined spatial relationship to the center pixel area is sampled. The sampled image data corresponding to the first set of pixel areas is compared to a first template. If the sampled image data corresponding to the first subset of pixel areas is of a predetermined relationship to the first template, image data corresponding to a second set of pixel areas in a second predetermined spatial relationship to the center pixel area is sampled. The sampled image data corresponding to the second set of pixel areas is compared to a second template. If the sampled image data corresponding to the second set of pixel areas is of a predetermined relationship to the second template, a first predetermined subset of subpixel areas is written within the center pixel area.

According to another aspect of the present invention, there is provided, in a digital printing apparatus for selectably writing in a subset of a set of pixel areas on a surface to obtain an image according to image data, a method of enhancing the image. For each of a plurality of center pixel areas in the image desired to be printed, image data corresponding to a first set of pixel areas in a first predetermined spatial relationship to the center pixel area is sampled. The sampled image data corresponding to the first set of pixel areas is compared to a first template. Image data corresponding to a second set of pixel areas in a second predetermined spatial relationship to the center pixel area is sampled. The sampled image data corresponding to the second set of pixel areas is compared to a second template. If the sampled image data corresponding to the second set of pixel areas is of a predetermined relationship to the first template and of a predetermined relationship to the second template, an image improvement algorithm is applied to the image data.

BRIEF DESCRIPTION OF THE DRAWINGS

FIG. 3 shows an example set of binary digits corresponding to pixel areas in image data, while

DETAILED DESCRIPTION OF THE INVENTION

Figure 8:
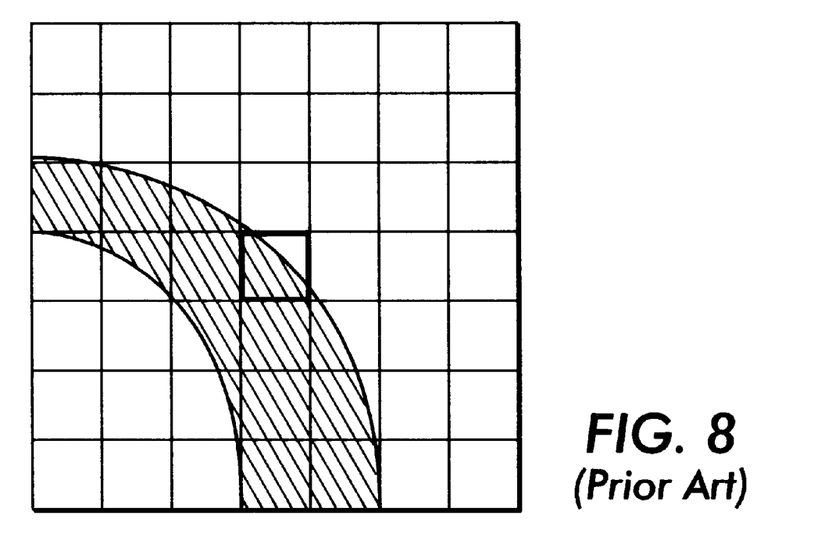
FIG. 8 is an illustration of a sample set of pixel areas as would be found, for example, in a small portion of an image desired to be printed with a digital printing apparatus.

FIG. 8 is an illustration of a sample set of pixel areas as would be found, for example, in a small portion of an image desired to be printed with a digital printing apparatus. As shown in the Figure, there are provided in this sample a window of 49 individual pixel areas in a 7×7 "window." As is known in the art, each individual pixel area represents a place in a surface, such as on a sheet of paper or area of photoreceptor, in which a portion of an image may be selectably written to obtain a desired image to be printed. The writing step may involve, for example, exposing or not exposing a particular small area of a photoreceptor to light, or ejecting or not ejecting a droplet of ink from an ink-jet printhead. The squares forming the array in the Figure each represent one pixel area. As is well-known, typically each pixel area corresponds to one bit of image data. The relationship of bits of image data to the size of each individual corresponding pixel area directly affects the resolution of the printing apparatus. If a binary digit corresponding to a particular pixel area is a 1, for example, this could mean that the pixel area is to be written black in the final image, while a 0 would indicate that the pixel area should be written white. Of course, different electrophotographic or ink-jet systems will have different conventions, but the basic principle is always the same.

Figure 4:
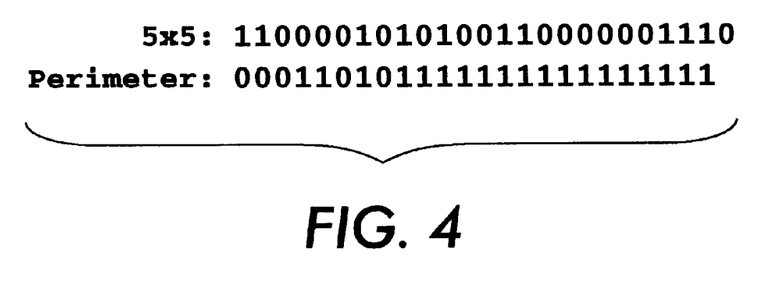
FIG. 4 shows example binary numbers derived from the pixel areas in FIG. 3.

At the center of the 7×7 array of pixel areas, shown marked by a heavy line, is a "center pixel." Although in the Figure only the center pixel in the array is shown as a "center pixel," it will be apparent that, over the course of printing an entire image, every pixel will essentially have its moment as a center pixel. (For those pixels toward the edges of the image, which may not have a full set of neighboring pixels around them, a set of buffering pixels can be artifically added to the image, so that those pixels can be analyzed.) As will be explained in detail below, an important function of the present invention is to determine the nature of what will be written in the center pixel as a function of the image data in a window of generally neighboring pixel areas. As shown in the Figure, a curved line which is desired to be printed will cause a certain subset of pixel areas in the window to be printed black. However, it is also apparent that the finite resolution of the printing apparatus (and of the data itself will result in jagged edges if the curved line is desired to be printed by selectably assigning 1's to print-black pixel areas and 0's to print-white pixel areas. The center pixel area in the Figure, forming a portion of the border of the curved line, will of course be the site of one or another type of jagged edge. Ideally, only a portion of the center pixel area should be printed black, preferably in a manner which would preserve as best as possible a curved appearance to the line desired to be printed. It should be noted that if, for example, the original image data of FIG. 4 is 300 dpi, the curved line intended to be printed would not be manifest in the original 300 dpi data; enhancing the resolution of the data by selectably writing to subpixel areas within each pixel area is obtained only by an intelligent interpolation of the original image data.

Figure 9:
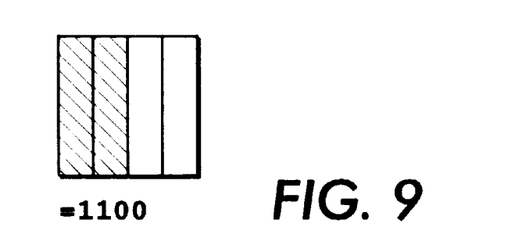
FIGS. 9 and 10 show examples of applying subpixel data within a single pixel area, to achieve resolution enhancement.
Figure 10:
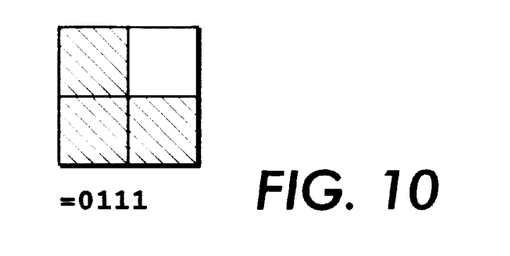

It is known in the art that certain types of digital printing apparatus are capable of selectably writing within "subpixel areas" within each individual pixel area. FIGS. 9 and 10 illustrate two types of printing within subpixels within a pixel area. In FIG. 9, four subpixel areas can be selectably written into, these four subpixels being arranged in effect side-by-side as shown. A side-by-side relationship of subpixels within a pixel area is typically possible by finely manipulating the duration of a particular modulation of a writing laser, as is generally known in the art. In FIG. 10, there are also four subpixels within the pixel area, but the four subpixel areas are arranged in quadrants within the single pixel area. (It is also conceivable to have other arrangements of a two-dimensional array of subpixels within a pixel area.)

In the particular convention shown in FIGS. 9 and 10, print-black subpixel areas are assigned 1's, and print-white subpixel areas are assigned 0's. In FIG. 9, the subpixels are assigned binary digits from left to right, while in FIG. 10, the subpixel areas are assigned binary digits by quadrant number, although of course a particular convention is not directly important to the present invention. The point is that, beyond assigning a simple 1 or 0 ("all or nothing") to a particular pixel area such as the center pixel area shown in FIG. 8, a particular pixel area can be effectively subdivided into subpixel areas, each subpixel area being capable of being selectably being written into, thus in effect enhancing the native resolution of the original image data.

According to the present invention, there is provided a system in which the sampling of a "neighborhood" of pixel data corresponding to neighboring pixel areas around a particular center pixel is performed in two distinct stages. In a preferred embodiment of the present invention, first is sampled a first set of image data corresponding to pixel areas closely surrounding a particular center pixel area. The image data of the close-in pixel areas are sampled and a match is attempted to be made with a set of templates, each template corresponding to a typical curved line or border as would be found in an image desired to be printed, such as in an alphanumeric character. If a template approximating a particular kind of curve is matched with the image data of neighboring pixel areas, the center pixel area can be enhanced accordingly, such as by causing the apparatus to write only a subset of subpixel areas within the center pixel area. However, further according to the present invention, if there is a match to a template for a first set of pixel data, a further "check" is provided, by sampling a second set image data, corresponding to a slightly further-out set of pixel areas. The image data corresponding to this second set of pixel areas is similarly compared with a set of templates, and whether this second set of image data matches one of these templates will further determine what type of enhancement, if any, is applied to the center pixel.

Figure 1:
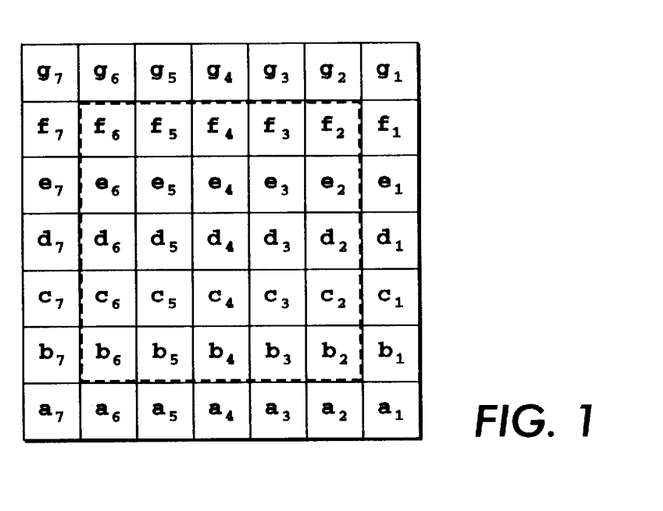
FIG. 1 is a diagram showing an arrangement of pixel areas around a center pixel, as used in one embodiment of the present invention.
Figure 2:
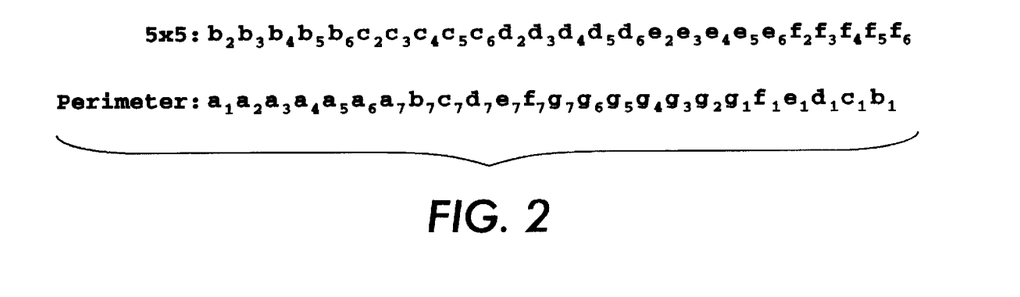
FIG. 2 shows an arrangement of digits in a pair of binary numbers derived from the pixel areas in FIG. 1.

To illustrate the basic principle of the present invention, FIG. 1 shows a 7×7 pixel area window of pixel areas around a center pixel area at the center of the array. For convenience, in the Figure, each pixel area is assigned a unique letter and number. Under this convention, the center pixel is indicated as $d_4$. According to the present invention, there is derived from the image data in the 7×7 pixel area window, two distinct sets of image data, a first set corresponding to the inner 5×5 pixel area window, and a second set of image data, corresponding to the pixel areas forming the perimeter pixel areas in the 7×7 window. The specific identities by identification number of each set is shown in FIG. 2.

Figure 3:
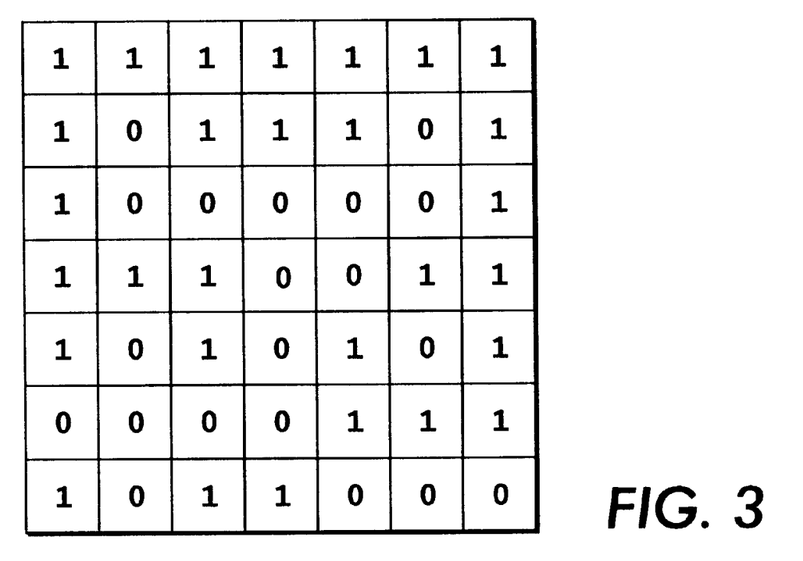

It will be apparent that the two sets of image data, a first set for the inner 5×5 window and a second set for the perimeter pixel areas, will yield two distinct binary numbers. FIGS. 3 and 4 show, repsectively, an example winow of pixel areas and a corresponding pair of binary numbers derived from the image data, with bits in the positions indicated in FIGS. 1 and 2. A 1 bit at a certain location within one or the other binary number can represent a print-black pixel area, and a 0 bit representing a print-white pixel area, although of course the conventions could readily be reversed. It can be seen that any 7×7 window of pixels will yield a 25-bit number representative of the image data in the inner 5×5 window (a first set of image data) and further a 24-bit binary number representing the image data in the perimeter pixel areas (a second set of image data).

Figure 5:
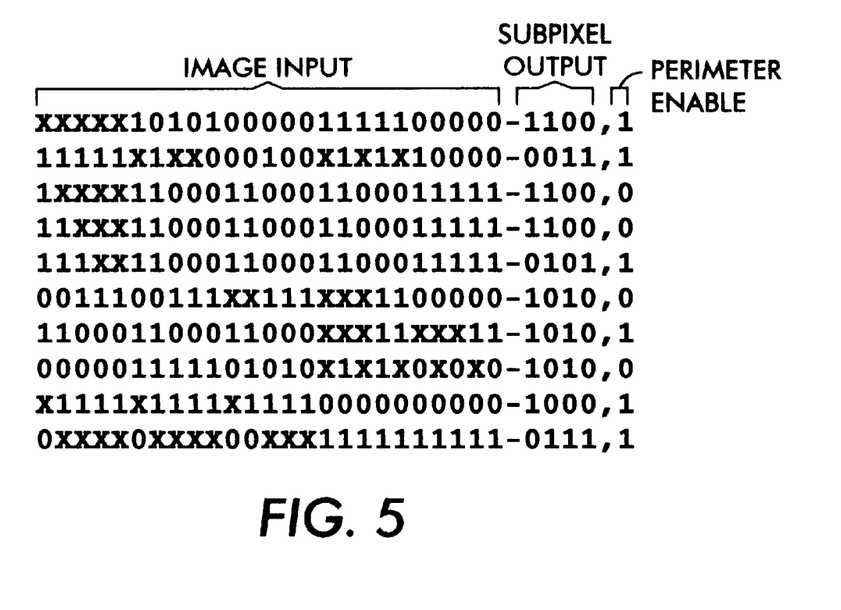
FIGS. 5 and 6 are example lists of templates in a look-up tables used in one embodiment of the present inevntion.

According to a preferred embodiment of the present invention, in a first step, when determining whether and how a particular center pixel should be enhanced by writing to subpixel areas therein, the number representing the image data in the 5×5 window of pixel areas is compared to a series of "templates" in a list of templates, to determine whether a match is found. An example of a list of templates is shown in FIG. 5. In the Figure, each line includes a 25 digit binary number with which any particular 5×5 window if image data will be compared. In this particular example, in addition to 1-bits and 0-bits, there may be provided "X-bits" which represent bits to which a particular template is indifferent, i.e., "don't care" bits. According to one aspect of the present invention, every particular 5×5 set of sample image data is sequentially compared to templates in a list such as in FIG. 5, and if a match is found (taking into account, where necessary, "don't care" bits) the particular center pixel area is written into by its subpixels, according to a "subpixel output," as shown. In this particular example, the "subpixel output" corresponding to any of the various templates for the 5×5 window corresponds to writing black or white into each of four subpixels forming the center pixel area. Thus, if a particular template for a 5×5 window effectively describes a curved line or border, when a window of a 5×5 image data comes up and is matched to a particular template in the list of templates, this match will cause the particular center pixel to be written into as a particular set of subpixel areas in a manner in which is intended to "smooth out" the curved area. In this way, a resolution enhancement of the original image data is possible.

Figure 6:
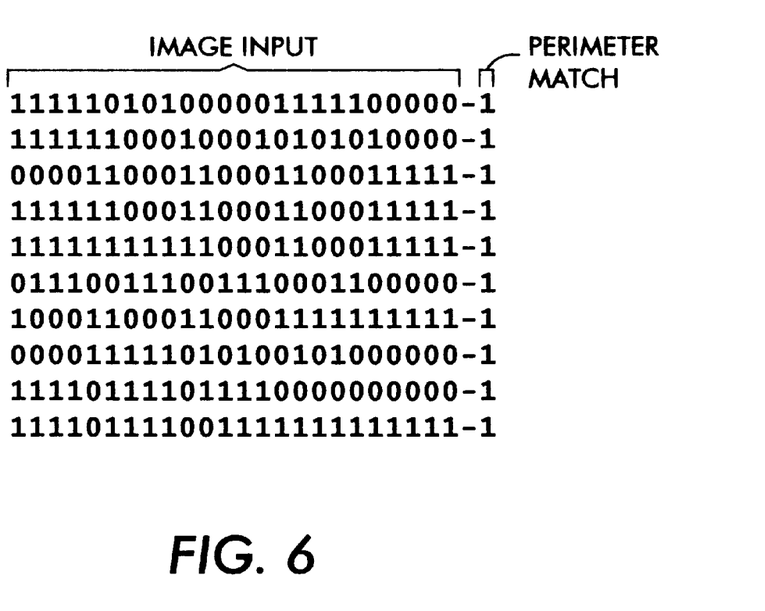

However, further according to the present invention, there is provided, under certain conditions, a "second stage" of template matching, the second stage involving not the 5×5 window of image data close to the center pixel area, but rather to the perimeter pixels around the 5×5 window. In FIG. 5, there is shown at the far right of each template in the list of templates, a final bit which is indicated as a "perimeter enable" bit. Depending on a particular convention, a 1 or 0 in this perimeter enable bit will activate another round of template matching of the perimeter pixel areas in the 7×7 window. If, in this example, the 5×5 window matches a particular line in the template list of FIG. 2A, not only will a subpixel output as shown in FIG. 5 attempted to be applied to the center pixel, but if the perimeter enable digit for the particular template is 1, the perimeter pixels from the same 7×7 window will be attempted to be matched to one of another list of templates. A partial example of such a list of templates for matching the perimeter pixel data is shown at FIG. 6; entries in this list of templates may also include "don't care" bits. The overall effect is that, in a first stage, a 5×5 window of image data around a center pixel is attempted to be matched to a template consistent with a particular printed feature such as a curved line or border; and then, if there is a template match in the first stage, a further check is provided in a second stage of template matching, the second stage of template matching applying only to the perimeter pixel areas around the original 5×5 pixel area window.

In a preferred embodiment of the present invention, the key reason for providing this two-stage template matching is to apply the subpixel-writing techniques of resolution enhancement only in certain printing contexts, specifically, in the smoothing of curved lines and borders of alphanumeric characters. What is not desired to be enhanced in this manner are sets of image data which correspond to areas in which a halftone is attempted to be printed. Applying such resolution enhancement or curve-smoothing techniques to halftone image data will most likely make nonsense of the halftone data. The second stage (perimeter pixel areas) template matching acts as a check to segregate out those image data patterns which are consistent with halftone data. Thus, according to a preferred embodiment of the present invention, the templates for the first stage of template matching are generally selected to identify neighborhoods of pixels consistent with curved lines or curved borders of alphanumeric characters, where resolution enhancement and curve-smoothing would be useful; if, however, the second stage templates detect data consistent with a halftoning technique, the resolution enhancement which was indicated in the first stage template matching is in effect canceled, and the original data printed "as is," without any resolution enhancement.

Figure 7:
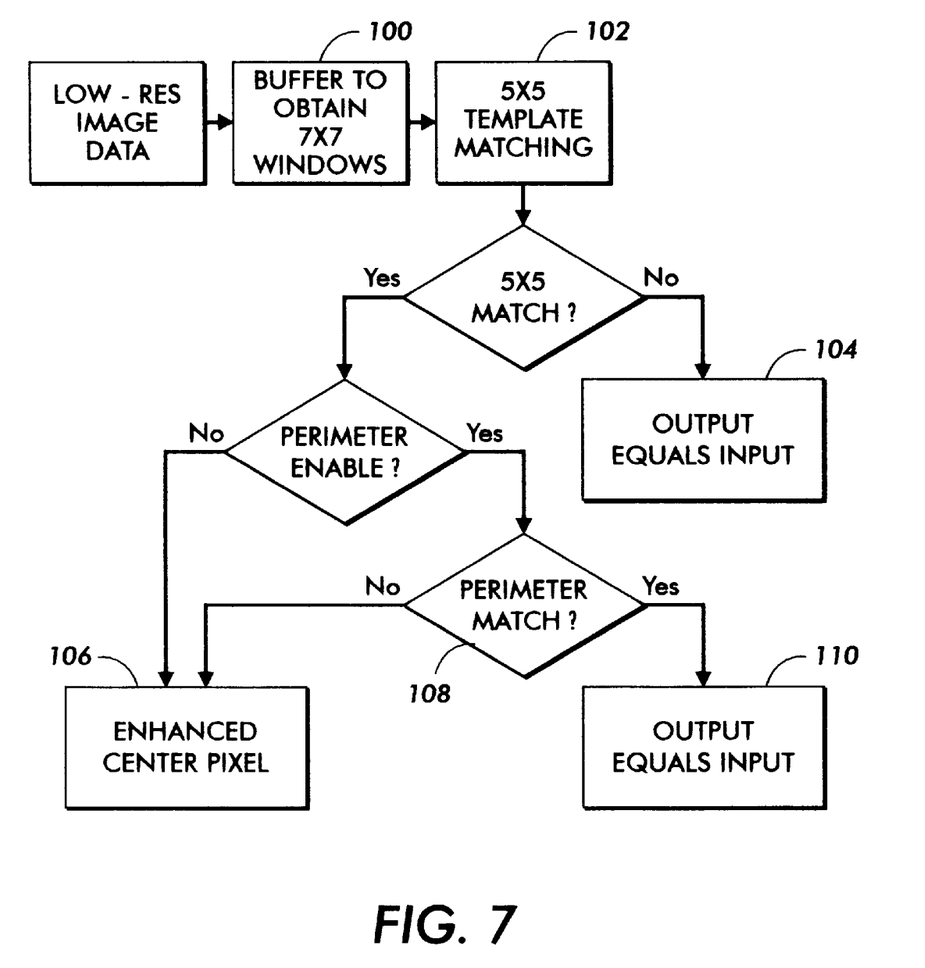
FIG. 7 is a flow-chart illustrating one embodiment of the method of the present invention.

An overview of a preferred embodiment the technique of the present invention is shown in the flowchart of FIG. 7. An original source of relatively low-resolution image data is buffered, through known means, to obtain a series of "windows" of 7×7 arrays of original image data, as shown at step 100. Once a series of 7×7 pixel area image data windows are obtained, for each window the inner 5×5 set of image data is attempted to be matched against a list of templates, such as shown in FIG. 5 (step 102). If a particular 5×5 set of image data does not match one of the templates (or else needs some sort of other predetermined relationship with one of the templates, such as matching a proportion of digits), then no resolution enhancement is deemed necessary for the particular center pixel, and thus what will be printed is simply the same input as in the original low-resolution image data, such as shown at step 104. However, if there is a match with a 5×5 template, a corresponding subpixel output, such as shown in FIG. 5, is taken into account, and also there is checked whether the "perimeter enable" digit corresponds to the matched template.

If the perimeter enable digit of the matched template is in this case 0, then, according to this particular embodiment of the present invention, the enhanced center pixel, such as with the writing to individual subpixel areas in the center pixel, is output, such as shown at box 106. If, however, the perimeter enable digit is in this case 1, the second stage of template matching, such as by comparing the perimeter pixels to the templates in the template list of FIG. 6, is carried out, such as shown at block 108. If the perimeter pixels in the 7×7 window do not match any template in the template list such as shown in FIG. 6, then the original recommended enhancement to the center pixel, as determined by the template match in the FIG. 5 template list, is output, once again as shown at block 106. If, however, the perimeter pixels match a particular template in the template list of FIG. 6, in a preferred embodiment of the present invention, this match is taken as a sign that the particular image data is in fact halftone data, and therefore the enhancement to the center pixel will not be necessary; in this case, the center pixel enhancement originally required by the template match of FIG. 5 is canceled and the final output is the unenhanced pixel datum of the center pixel area, such as shown at block 110.

As used in the claims hereinbelow, a particular first or second set of image data must be "of a predetermined relationship" to a template to cause a result; this "predetermined relationship," according to possible variants of the invention, could be a perfect match to a template, a partial match of a template (e.g., 75% of bits match), or not matching any of a list of templates at all.

Although in the above-described embodiment of the present invention, a first set of pixel data in a neighborhood around a center pixel area forms a 5×5 array of pixel areas around the center pixel area, and the second set of pixel areas surround the 5×5 array, other spatial relationships of the first and second set of neighboring pixel areas around a center pixel area can be used. The windows formed by the first and second sets of neighboring pixel areas need not form square, or even rectangular, windows: it may be desirable, for example, to provide diamond- or other shaped windows. It is similarly not necessary that all of the pixel areas in the first set be closer to the center pixel area than all of the pixel areas in the second set.

The particular "design" of templates for either the FIG. 5 template list or the FIG. 6 template list can be designed specific to a particular type of printing hardware, such as ink-jet or electrophotographic. The specific design of templates can also be customized to relate to whether the electrophotographic printing apparatus uses laser exposure to create the white areas or the black areas of an image; for instance, "write white" xerographic engines tend to exhibit a difference in thickness between vertical and horizontal lines of the same intended width, and templates can be designed to compensate for this.

When compiling a list of templates, each template corresponding to a pattern of neighboring pixels data consistent with a curved line or border, it will be apparent that certain templates will be redundant with respect to other templates, i.e., one template will include the pattern of another template, plus further 1 or 0 bits in locations where the other template had an X bit. In such a case, a given pattern of pixels in the original image data will in fact match more than one template in the list. Preferably, the templates in a template list are arranged to take into account this redundancy so that, when a particular set of image data is caused to be compared to each template in sequence, redundant templates for a particular set of image data are avoided. Alternatively, a sample set of image data can be applied to a large number of templates effectively simultaneously, with different templates being weighted. When there are multiple matches of templates, the template with the highest weight is used.

The above-described techniques can be applied to the decision on whether to apply any kind of image enhancement algorithm or method to image data, not only, as in the illustrated embodiment, to writing a subset of subpixels within a center pixel area. In general, the present invention involves taking a sample of image data near a center pixel, and another sample of pixel data generally a little further from the center pixel, and then using these two samples to determine whether an enhancement method should be applied to the image data.

While the invention has been described with reference to the structure disclosed, it is not confined to the details set forth, but is intended to cover such modifications or changes as may come within the scope of the following claims.

What is claimed is:

1. The method of claim 1, further comprising the step of if the sampled image data corresponding to the first set of pixel areas is of said predetermined relationship to the first template, and the sampled image data corresponding to the second set of pixel areas is of a predetermined relationship to the second template, writing a second predetermined subset of subpixel areas within the center pixel area different from the first predetermined subset of subpixel areas within the center pixel area.

2. The method of claim 1, at least a portion of the first set of pixel areas being disposed closer to the center pixel area than at least a portion of the second set of pixel areas.

3. In a digital printing apparatus for selectably writing in a subset of a set of pixel areas on a surface to obtain an image according to image data, the printing apparatus further being capable of selectably writing within a subset of a set of subpixel areas within each pixel area, a method of enhancing the image data, comprising the steps of:

for each of a plurality of center pixel areas in the image desired to be printed, sampling image data corresponding to a first set of pixel areas in a first predetermined spatial relationship to the center pixel area;

comparing the sampled image data corresponding to the first set of pixel areas to a first template;

if the sampled image data corresponding to the first set of pixel areas is of a predetermined relationship to the first template, sampling image data corresponding to a second set of pixel areas in a second predetermined spatial relationship to the center pixel area, all of the first set of pixel areas being disposed closer to the center pixel area than all of the second set of pixel areas;

comparing the sampled image data corresponding to the second set of pixel areas to a second template; and if the sampled image data corresponding to the second set of pixel areas is of a predetermined relationship to the second template, writing a first predetermined subset of subpixel areas within the center pixel area.

4. The method of claim 1, the first set of pixel areas surrounding the center pixel area, and the second set of pixel areas surrounding the first set of pixel areas.

5. The method of claim 3, the digital printing apparatus being capable of selectably writing in subpixel areas within each pixel area, the subpixel areas being arranged side-by-side within the pixel area.

6. The method of claim 3, the digital printing apparatus being capable of selectably writing in subpixel areas within each pixel area, the subpixel areas being arranged in a two-dimensional array within the pixel area.

7. In a digital printing apparatus for selectably writing in a subset of a set of pixel areas on a surface to obtain an image according to image data, the printing apparatus further being capable of selectably writing within a subset of a set of subpixel areas within each pixel area, a method of enhancing the image data, comprising the steps of:

for each of a plurality of center pixel areas in the image desired to be printed, sampling image data corresponding to a first set of pixel areas in a first predetermined spatial relationship to the center pixel area;

comparing the sampled image data corresponding to the first set of pixel areas to a first template, the first template being a member of a first list of templates;

if the sampled image data corresponding to the first set of pixel areas is of a predetermined relationship to the first template, sampling image data corresponding to a second set of pixel areas in a second predetermined spatial relationship to the center pixel area;

comparing the sampled image data corresponding to the second set of pixel areas to a second template;

if the sampled image data corresponding to the second set of pixel areas is of a predetermined relationship to the second template, writing a first predetermined subset of subpixel areas within the center pixel area; and comparing the sampled image data corresponding to the first set of pixel areas to a plurality of templates in the first list of templates.

8. The method of claim 7, the second template being a member of a second list of templates, and further comprising the step of comparing the sampled image data corresponding to the second set of pixel areas to a plurality of templates in the second list of templates.

9. The method of claim 8, at least a portion of the first set of pixel areas being disposed closer to the center pixel area than at least a portion of the second set of pixel areas.

10. In a digital printing apparatus for selectably writing in a subset of a set of pixel areas on a surface to obtain an image according to image data, a method of enhancing an image, comprising the steps of:

for each of a plurality of center pixel areas in the image desired to be printed, sampling image data corresponding to a first set of pixel areas in a first predetermined spatial relationship to the center pixel area;

comparing the sampled image data corresponding to the first set of pixel areas to a first template;

sampling image data corresponding to a second set of pixel areas in a second predetermined spatial relationship to the center pixel area, all of the first set of pixel areas being disposed closer to the center pixel area than all of the second set of pixel areas;

comparing the sampled image data corresponding to the second set of pixel areas to a second template; and if the sampled image data corresponding to the first set of pixel areas is of a predetermined relationship to the first template, and the sampled image data corresponding to the second set of pixel areas is of a predetermined relationship to the second template, applying an image improvement algorithm to the image data.

11. In a digital printing apparatus for selectably writing in a subset of a set of pixel areas on a surface to obtain an image according to image data, a method of enhancing an image, comprising the steps of:

for each of a plurality of center pixel areas in the image desired to be printed, sampling image data corresponding to a first set of pixel areas in a first predetermined spatial relationship to the center pixel area;

comparing the sampled image data corresponding to the first set of pixel areas to a first template, the first template being a member of a first list of templates;

sampling image data corresponding to a second set of pixel areas in a second predetermined spatial relationship to the center pixel area;

comparing the sampled image data corresponding to the second set of pixel areas to a second template if the sampled image data corresponding to the first set of pixel areas is of a predetermined relationship to the first template, and the sampled image data corresponding to the second set of pixel areas is of a predetermined relationship to the second template, applying an image improvement algorithm to the image data; and comparing the sampled image data corresponding to the first set of pixel areas to a plurality of templates in the first list of templates.

12. The method of claim 11, the second template being a member of a second list of templates, and further comprising the step of comparing the sampled image data corresponding to the second set of pixel areas to a plurality of templates in the second list of templates.

13. In a digital printing apparatus for selectably writing in a subset of a set of pixel areas on a surface to obtain an image according to image data, the printing apparatus further being capable of selectable writing within a subset of a set of subpixel areas within each pixel area, a method of enhancing the image data, comprising the steps of:

for each of a plurality of center pixel areas in the image desired to be printed, sampling image data corresponding to a first set of pixel areas in a first predetermined spatial relationship to the center pixel area, all of the first set of pixel areas being disposed closer to the center pixel area than all of the second set of pixel areas;

comparing the sampled image data corresponding to the first set of pixel areas to a first template;

if the sampled image data corresponding to the first set of pixel areas is of a predetermined relationship to the first template, thereby determining the sampled image data corresponding to the first set of pixel areas as possibly being related to rendering curved lines in an image, and sampling image data corresponding to a second set of pixel areas in a second predetermined spatial relationship to the center pixel area;

comparing the sampled image data corresponding to the second set of pixel areas to a second template;

if the sampled image data corresponding to the second set of pixel areas is of a predetermined relationship to the second template, writing a first predetermined subset of subpixel areas within the center pixel area, the first predetermined subset of subpixel areas within the center pixel area having an effect of applying an image enhancement algorithm to the image data.

14. In a digital printing apparatus for selectably writing in a subset of a set of pixel areas on a surface to obtain an image according to image data, the printing apparatus further being capable of selectably writing within a subset of a set of subpixel areas within each pixel area, a method of enhancing the image data, comprising the steps of:

for each of a plurality of center pixel areas in the image desired to be printed, sampling image data corresponding to a first set of pixel areas in a first predetermined spatial relationship to the center pixel area, the first set of pixel areas surrounding the center pixel area, and the second set of pixel areas surrounding the first set of pixel areas;

comparing the sampled image data corresponding to the first set of pixel areas to a first template;

if the sampled image data corresponding to the first set of pixel areas is of a predetermined relationship to the first template, thereby determining the sampled image data corresponding to the first set of pixel areas as possibly being related to rendering curved lines in an image, and sampling image data corresponding to a second set of pixel areas in a second predetermined spatial relationship to the center pixel area;

comparing the sampled image data corresponding to the second set of pixel areas to a second template;

if the sampled image data corresponding to the second set of pixel areas is of a predetermined relationship to the second template, writing a first predetermined subset of subpixel areas within the center pixel area, the first predetermined subset of subpixel areas within the center pixel area having an effect of applying an image enhancement algorithm to the image data.

\* \* \* \* \*

UNITED STATES PATENT AND TRADEMARK OFFICE
CERTIFICATE OF CORRECTION

PATENT NO.   : 6,129,457
DATED        : October 10, 2000
INVENTOR(S)  : Thompson Jr. et al.

It is certified that error appears in the above-identified patent and that said Letters Patent is hereby corrected as shown below:

Claims 1-3 and 5-6 shall read as follows:

1. In a digital printing apparatus for selectably writing in a subset of a set of pixel areas on a surface to obtain an image according to image data, the printing apparatus further being capable of selectably writing within a subset of a set of subpixel areas within each pixel area, a method of enhancing the image data, comprising the steps of:

for each of a plurality of center pixel areas in the image desired to be printed, sampling image data corresponding to a first set of pixel areas in a first predetermined spatial relationship to the center pixel area;

comparing the sampled image data corresponding to the first set of pixel areas to a first template;

if the sampled image data corresponding to the first set of pixel areas is of a predetermined relationship to the first template, sampling image data corresponding to a second set of pixel areas in a second predetermined spatial relationship to the center pixel area, all of the first set of pixel areas being disposed closer to the center pixel area than all of the second set of pixel areas;

comparing the sampled image data corresponding to the second set of pixel areas to a second template; and if the sampled image data corresponding to the second set of pixel areas is of a predermined relationship to the second template, writing a first predetermined subset of subpixel areas within the center pixel area.

3. The method of claim 1, further comprising the step of
if the sampled image data corresponding to the first set of pixel areas is of said predetermined relationship to the first template, and the sampled image data corresponding to the second set of pixel areas is of a predetermined relationship to the second template, writing a second predetermined subset of subpixel areas within the center pixel area different from the first predetermined subset of subpixel areas within the center pixel area.

5. The method of claim 1, the digital printing apparatus being capable of selectably writing in subpixel areas within each pixel area, the subpixel areas being arranged side-by-side within the pixel area.

UNITED STATES PATENT AND TRADEMARK OFFICE
CERTIFICATE OF CORRECTION

PATENT NO. : 6,129,457
DATED : October 10, 2000
INVENTOR(S) : Thompson Jr. et al.

It is certified that error appears in the above-identified patent and that said Letters Patent is hereby corrected as shown below:

6. The method of claim 1, the digital printing apparatus being capable of selectably writing in subpixel areas within each pixel area, the subpixel areas being arranged in a two-dimensional array within the pixel area.

Signed and Sealed this

Twenty-fifth Day of December, 2001

*Attest:*

JAMES E. ROGAN
*Attesting Officer*  *Director of the United States Patent and Trademark Office*